(12) United States Patent
Ljungblad

(10) Patent No.: US 11,517,964 B2
(45) Date of Patent: Dec. 6, 2022

(54) METHOD FOR ADDITIVE MANUFACTURING

(71) Applicant: Arcam AB, Moelndal (SE)

(72) Inventor: Ulric Ljungblad, Moelndal (SE)

(73) Assignee: Arcam AB, Moelndal (SE)

( * ) Notice: Subject to any disclaimer, the term of this patent is extended or adjusted under 35 U.S.C. 154(b) by 314 days.

(21) Appl. No.: 16/548,094

(22) Filed: Aug. 22, 2019

(65) Prior Publication Data

US 2019/0375016 A1 Dec. 12, 2019

Related U.S. Application Data

(62) Division of application No. 14/547,549, filed on Nov. 19, 2014, now Pat. No. 10,434,572.

(Continued)

(51) Int. Cl.
*B22F 10/20* (2021.01)
*B29C 64/153* (2017.01)
(Continued)

(52) U.S. Cl.
CPC ............ *B22F 10/20* (2021.01); *B29C 64/153* (2017.08); *B29C 64/268* (2017.08); *B33Y 10/00* (2014.12);
(Continued)

(58) Field of Classification Search
CPC .......... B22F 10/20; B22F 10/30; B22F 12/00; B29C 64/268; B29C 64/153; B29C 64/393; B33Y 10/00; B33Y 50/02; Y02P 10/25
See application file for complete search history.

(56) References Cited

U.S. PATENT DOCUMENTS 2,264,968 A 12/1941 DeForest
2,323,715 A 7/1943 Kuehni
(Continued)

FOREIGN PATENT DOCUMENTS

CN 2860188 A1 6/2006
CN 101607311 A 12/2009
(Continued)

OTHER PUBLICATIONS

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.
(Continued)

*Primary Examiner* — John A Hevey
(74) *Attorney, Agent, or Firm* — Dinsmore & Shohl LLP

(57) ABSTRACT

A method for forming a three-dimensional article through successive fusion of parts of a powder bed comprising: providing a model of the three dimensional article, applying a first powder layer on a work table, directing an energy beam over the work table causing the first powder layer to fuse in selected locations according to the model to form a first cross section of the three-dimensional article, applying a second powder layer on the work table, directing the energy beam over the work table causing the second powder layer to fuse in selected locations according to the model to form a second cross section of the three-dimensional article, wherein the second layer is bonded to the first layer, detecting a local thickness in at least two positions in at least the second powder layer, varying an energy beam parameter depending on the detected local thickness of the second powder layer.

6 Claims, 7 Drawing Sheets

Related U.S. Application Data

(60) Provisional application No. 61/918,207, filed on Dec. 19, 2013.

(51) Int. Cl.
*B29C 64/268* (2017.01)
*B33Y 10/00* (2015.01)
*B33Y 50/02* (2015.01)
*B22F 10/30* (2021.01)

(52) U.S. Cl.
CPC .............. *B33Y 50/02* (2014.12); *B22F 10/30* (2021.01); *Y02P 10/25* (2015.11)

(56) References Cited

U.S. PATENT DOCUMENTS

| | | |
|---|---|---|
| 3,634,644 A | 1/1972 | Ogden et al. |
| 3,838,496 A | 10/1974 | Kelly |
| 3,882,477 A | 5/1975 | Mueller |
| 3,906,229 A | 9/1975 | Demeester et al. |
| 3,908,124 A | 9/1975 | Rose |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,651,002 A | 3/1987 | Anno |
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,508,489 A | 4/1996 | Benda et al. |
| 5,511,103 A | 4/1996 | Hasegawa |
| 5,595,670 A | 1/1997 | Mombo Caristan |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,204,469 B1 | 3/2001 | Fields et al. |
| 6,215,093 B1 | 4/2001 | Meiners et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 * | 1/2004 | Das ........................ B33Y 10/00 419/7 |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Turek et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Hochsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 * | 3/2012 | Philippi ................ B29C 64/153 427/8 |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,254,535 B2 | 2/2016 | Buller et al. |
| 9,310,188 B2 | 4/2016 | Snis |
| 9,505,172 B2 | 11/2016 | Ljungblad |
| 9,550,207 B2 | 1/2017 | Ackelid |
| 9,802,253 B2 | 10/2017 | Jonasson |
| 9,950,367 B2 | 4/2018 | Backlund et al. |
| 10,071,422 B2 | 9/2018 | Buller et al. |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173946 A1 | 9/2004 | Srinivasan |
| 2004/0204765 A1 | 10/2004 | Fenning et al. |
| 2004/0217095 A1 | 11/2004 | Herzog |
| 2005/0173380 A1 | 8/2005 | Carbone |
| 2005/0186538 A1 | 8/2005 | Uckelmann |
| 2005/0282300 A1 | 12/2005 | Yun et al. |
| 2006/0108712 A1 | 5/2006 | Mattes |
| 2006/0138325 A1 | 6/2006 | Choi |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1 | 1/2010 | Larsson et al. |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 * | 4/2012 | Ljungblad .......... B23K 15/0013 419/7 |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ljungblad |

(56) References Cited

U.S. PATENT DOCUMENTS

| | | |
|---|---|---|
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Lowegren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271328 A1* | 9/2014 | Burris .................. B33Y 10/00 419/53 |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174695 A1 | 6/2015 | Elfstroem et al. |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0145381 A1 | 5/2016 | Kou et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0080494 A1 | 3/2017 | Ackelid |
| 2017/0087661 A1 | 3/2017 | Backlund et al. |
| 2017/0246685 A1 | 3/2017 | Hellestam |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0154444 A1 | 6/2018 | Jonassen |

FOREIGN PATENT DOCUMENTS

| | | |
|---|---|---|
| CN | 101635210 A | 1/2010 |
| CN | 201693176 U | 1/2011 |
| CN | 101607311 B | 9/2011 |
| CN | 203509463 U | 4/2014 |
| CN | 103341625 B | 5/2015 |
| DE | 19952998 A1 | 5/2001 |
| DE | 20305843 U1 | 7/2003 |
| DE | 102000035434 A1 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008012064 A1 | 9/2009 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 0856393 A2 | 8/1998 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| EP | 2289652 A1 | 3/2011 |
| EP | 2292357 A1 | 3/2011 |
| EP | 2832474 A1 | 2/2015 |
| FR | 2980380 A1 | 3/2013 |
| JP | H05-171423 A | 7/1993 |
| JP | 2003241394 A | 8/2003 |
| JP | 2003245981 | 9/2003 |
| JP | 2009006509 A | 1/2009 |
| SE | 524467 C2 | 8/2004 |
| WO | 199308928 A1 | 5/1993 |
| WO | 1996012607 A1 | 5/1996 |
| WO | 199737523 A2 | 10/1997 |
| WO | 200185386 A2 | 11/2001 |
| WO | 2001081031 A1 | 11/2001 |
| WO | 2002008653 A1 | 1/2002 |
| WO | 2004007124 A1 | 1/2004 |
| WO | 2004043680 A2 | 5/2004 |
| WO | 2004054743 A1 | 7/2004 |
| WO | 2004056511 A1 | 7/2004 |
| WO | 2004106041 A2 | 12/2004 |
| WO | 2004108398 A1 | 12/2004 |
| WO | 2006091097 A2 | 8/2006 |
| WO | 2006121374 A1 | 11/2006 |
| WO | 2007112808 A1 | 10/2007 |
| WO | 2007147221 A1 | 12/2007 |
| WO | 2008013483 A1 | 1/2008 |
| WO | 2008057844 A1 | 5/2008 |
| WO | 2008074287 A1 | 6/2008 |
| WO | 2008125497 A1 | 10/2008 |
| WO | 2008147306 A1 | 12/2008 |
| WO | 2009000360 A1 | 12/2008 |
| WO | 2009072935 A1 | 6/2009 |
| WO | 2009084991 A1 | 7/2009 |
| WO | 2010095987 A1 | 8/2010 |
| WO | 2010125371 A1 | 11/2010 |
| WO | 2011008143 A1 | 1/2011 |
| WO | 2011011818 A1 | 2/2011 |
| WO | 2011030017 A1 | 3/2011 |

(56) References Cited

FOREIGN PATENT DOCUMENTS

| WO | 2011060312 A2 | 5/2011 |
| --- | --- | --- |
| WO | 2012102655 A1 | 8/2012 |
| WO | 2013092997 A1 | 6/2013 |
| WO | 2013098050 A1 | 7/2013 |
| WO | 2013098135 A1 | 7/2013 |
| WO | 2013159811 A1 | 10/2013 |
| WO | 2013167194 A1 | 11/2013 |
| WO | 2013178825 A2 | 12/2013 |
| WO | 2014071968 A1 | 5/2014 |
| WO | 2014092651 A1 | 6/2014 |
| WO | 2014095200 A1 | 6/2014 |
| WO | 2014095208 A1 | 6/2014 |
| WO | 2014195068 A1 | 12/2014 |
| WO | 2015032590 A1 | 3/2015 |
| WO | 2015091813 A1 | 6/2015 |
| WO | 2015120168 A1 | 8/2015 |
| WO | 2015142492 A1 | 9/2015 |

OTHER PUBLICATIONS

European Search Report dated Feb. 16, 2012 for corresponding Application No. EP07852089.7.

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

International Preliminary Examining Authority (IPEA), Second Written Opinion for International Application No. PCT/EP2021/076025, dated Dec. 4, 2013, 4 pages European Patent Office, Germany.

International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, dated Apr. 4, 2014, 15 pages, European Patent Office, Germany.

International Preliminary Examining Authority, International Preliminary Report on Patentability for International Application No. PCT/EP2012/074383, including Applicant's Sep. 6, 2013 Reply to the ISA's Feb. 27, 2013 Written Opinion dated Feb. 27, 2013 Written Opinion, dated Jan. 20, 2014, European Patent Office, Netherlands.

International Preliminary Report on Patentability, dated Nov. 27, 2009, of corresponding International Application No. PCT/SE2007/001084.

International Search Report dated Apr. 9, 2010 for Application No. PCT/SE2009/050901.

International Search Report dated Sep. 17, 2008 for Application No. PCT/SE2008/000007.

International Search Report dated Sep. 2, 2008 of corresponding International Application No. PCT/SE2007/001084.

International Searching Authority (ISA), International Search Report and Written Opinion for International Application No. PCT/EP2012/076025, dated May 17, 2013, 11 pages, European Patent Office, The Netherlands.

International Searching Authority, International Search Report and Written Opinion for International Application No. PCT/EP2012/074383, dated Feb. 27, 2013, 10 pages, European Patent Office, The Netherlands.

International Searching Authority, International Search Report and Written Opinion for International Application No. PCT/SE2011/050093, dated Oct. 20, 2011, 5 pages, The Swedish Patent and Registration Office, Sweden.

Weigel, Th., et al., "Design and Preparation of Polymeric Scaffolds For Tissue Engineering," Expert Rev. Med. Devices, 2006, pp. 835-851, vol. 3, No. 6, XP002691485.

Gibson, D.W., et al., "Additive Manufacturing technologies: Rapid Prototyping to Direct Digital Manufacturing", 2010, pp. 126-129, Springer, New York.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

International Searching Authority, International Search Report for International Application No. PCT/EP2012/057470, dated Jan. 24, 2013, 1 page, European Patent Office, The Netherlands.

International Searching Authority, International Search Report for International Application No. PCT/EP2012/058733, dated Mar. 5, 2013, 4 pages, European Patent Office, The Netherlands.

International Search Report and Written Opinion for International Application No. PCT/EP2014/078487 dated Mar. 30, 2015 (11 Pages).

Klassen, Alexander, et al., "Modelling of Electron Beam Absorption in Complex Geometries", Journal of Physics D: Applied Physics, Jan. 15, 2014, 12 pages, vol. 47, No. 6, Institute of Physics Publishing Ltd., Great Britain.

Motojima, Seiji, et al., "Chemical Vapor Growth of LaB6 Whiskers and Crystals Having a Sharp Tip", Journal of Crystal Growth, vol. 44, No. 1, Aug. 1, 1978 (Aug. 1, 1978), pp. 106-109.

* cited by examiner

METHOD FOR ADDITIVE MANUFACTURING

CROSS-REFERENCE TO RELATED APPLICATIONS

This application is a divisional of U.S. Non-provisional patent application Ser. No. 14/547,549 filed Nov. 19, 2014 which claims priority to and the benefit of U.S. Provisional Patent Application Ser. No. 61/918,207, filed Dec. 19, 2013, the contents of both of which are hereby incorporated by reference in their entirety.

BACKGROUND

Related Field

The present invention relates to a method for forming a three-dimensional article through successive fusion of powder layers.

Description of Related Art

Freeform fabrication or additive manufacturing is a method for forming three-dimensional articles through successive fusion of chosen parts of powder layers applied to a worktable. A method and apparatus according to this technique is disclosed in US 2009/0152771.

Such an apparatus may comprise a work table on which the three-dimensional article is to be formed, a powder dispenser, arranged to lay down a thin layer of powder on the work table for the formation of a powder bed, a ray gun for delivering energy to the powder whereby fusion of the powder takes place, elements for control of the ray given off by the ray gun over the powder bed for the formation of a cross section of the three-dimensional article through fusion of parts of the powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

In US 2009/0152771 it is provided a camera for capturing an Infrared-radiation image, more particularly this camera is used for detecting irregularities in a newly applied powder layer. The irregularities may, according to US 2009/0152771, be caused by irregular applying of the powder on the working table or contamination on the powder dispenser or impurities in the powder as such.

There is a need in the art for forming three-dimensional objects with controlled material characteristics given that there may be irregularities in the applied powder layer.

BRIEF SUMMARY

An object of the invention is to provide a method for forming three-dimensional articles produced by freeform fabrication or additive manufacturing with improved control of material characteristics.

The abovementioned object is achieved by the features in the method according to claim 1.

In a first aspect of the invention it is provided a method for forming at least one three-dimensional article through successive fusion of parts of a powder bed, which parts correspond to successive cross sections of the at least one three-dimensional article, the method comprising the steps of: providing a model of the at least one three dimensional article, applying a first powder layer on a work table, directing at least one energy beam over the work table causing the first powder layer to fuse in selected locations according to the model to form a first cross section of the three-dimensional article, applying a second powder layer on the work table, directing the at least one energy beam over the work table causing the second powder layer to fuse in selected locations according to the model to form a second cross section of the three-dimensional article, wherein the second layer is bonded to the first layer, wherein the method further comprising the steps of: detecting a local thickness in at least two positions in at least the second powder layer, and varying an energy beam parameter depending on the detected local thickness of the second powder layer in order to melt the second powder layer and to remelt at least a predetermined thickness of the first cross section.

By detecting the actual powder layer thickness one may control the remelting of the underlying already fused powder layer in order to achieve desirable material characteristics. The more positions that are detected for a single powder layer the better the control of the actual powder layer thickness and the more accurate the remelting may be by adjusting at least one appropriate energy beam parameter. The detection of the actual powder layer thickness of the powder layer which is to be melted may eliminate cases where there are powder areas which are not sufficiently melted leaving unmelted powder material inside the final three dimensional structure. By having control of the thickness of powder layer to be melted and having the ability to change at least one energy beam parameter makes it possible to control the remelting of the underlying layer at any desirable position.

In one example embodiment of the present invention a the remelted predetermined thickness is constant throughout the portions of the first cross section which is remelted. By keeping the remelted thickness to a constant thickness throughout the cross section of the three-dimensional article which is to be built, one is able to more accurately predict the material characteristics of the final product compared to if the remelted thickness would vary throughout the same cross section.

In still another example embodiment of the present invention the energy beam is an electron beam and/or a laser beam. The present invention is applicable to powder based layerwise additive manufacturing using any kind of energy source for melting/fusing/binding the powder material and attaching it to the previous layer.

In yet another example embodiment of the present invention the powder is metallic powder. Obviously any material of the powder may be used as long as the energy beam is appropriate for fusing/melting such type of powder.

In still another example embodiment of the present invention the energy beam parameter is at least one of the group of: beam power, beam deflection speed and/or beam spot size. When knowing a possible variation of the thickness of the powder layer to be melted there is a need to vary the energy deposition into the powder layer in each and every position for making sure that the actual remelting of the underlying layer will correspond to the desired remelting of the underlying layer. As the powder layer thickness in some point in time is fixed, the thickness is detected and used for vary any suitable parameter of the energy beam to satisfy the desired material characteristics.

In still another example embodiment of the present invention the local thickness is determined by correlating an actual brightness increase between at least two consecutive images captured by an IR-camera, a CCD-camera, a digital camera, a CMOS camera or a NIR-camera with a predetermined thickness. Thickness variations may be detected by studying the temperature increase rate of a newly applied powder layer. This temperature increase rate will show up as brightness variations in captured images of the powder layer. By correlating the brightness increase between two consecutive images one may determine the actual thickness for each and every position of the image.

In yet another example embodiment the images are captured before the second powder layer reaches its maximum temperature. In another embodiment the images are captured after the second powder layer reaches its maximum temperature. One may need to know on which side of the temperature maximum the images are captured for assuring reliable thickness variation determination.

In still another example embodiment the local thickness is determined by the steps of: detecting a first topography of a surface onto which a new powder layer is to be applied, detecting a second topography of a surface of the new powder layer, subtracting the second topography with the first topography resulting in a third topography, and adding a distance the work table is lowered to the third topography resulting in the thickness of the new powder layer. The topography of the surfaces may be determined via or by means of images from SEM, 3-D scanner or triangulation. This kind of thickness determination may be more accurate than the above described method which is using brightness images.

In still another example embodiment the predetermined thickness of the first cross section, which is remelted, may be 1-5%, 5-10%, 10-20% or greater than 50% of the thickness of the first cross section. In another embodiment the full thickness of the previous layer is remelted. The degree of remelting may be set depending on the actual build temperature, the powder material used, the powder particle distribution and/or the type of energy beam source which is used for fusing or melting the powder particles.

In another aspect of the present invention it is provided a program element configured and arranged when executed on a computer to implement a method for forming at least one three-dimensional article through successive fusion of parts of a powder bed, which parts correspond to successive cross sections of the at least one three-dimensional article, the method comprising the steps of: providing a model of the at least one three dimensional article, applying a first powder layer on a work table, directing at least one energy beam over the work table causing the first powder layer to fuse in selected locations according to the model to form a first cross section of the three-dimensional article, applying a second powder layer on the work table, directing the at least one energy beam over the work table causing the second powder layer to fuse in selected locations according to the model to form a second cross section of the three-dimensional article, wherein the second layer is bonded to the first layer, wherein the method further comprising the steps of: detecting a local thickness in at least two positions in at least the second powder layer, and varying an energy beam parameter depending on the detected local thickness of the second powder layer in order to melt the second powder layer and to remelt at least a predetermined thickness of the first cross section.

In still another example embodiment it is provided a computer readable medium having stored thereon the program element as disclosed above. The computer readable storage medium may be the control unit described elsewhere herein or another control unit or comparable device. The computer readable storage medium and the program element, which may comprise computer-readable program code portions embodied therein, may further be contained within a non-transitory computer program product. Further details in this regard are provided elsewhere herein.

According to another aspect of various embodiments of the invention described herein, a non-transitory computer program product comprising at least one non-transitory computer-readable storage medium having computer-readable program code portions embodied therein is provided. The computer-readable program code portions comprise: an executable portion configured for, upon receipt of a model of at least one three dimensional article, applying a first powder layer on a work table so as to initiate forming said at least at least one three-dimensional article through successive fusion of parts of a powder bed, which parts correspond to successive cross sections of the at least one three-dimensional article; an executable portion configured for directing at least one energy beam over said work table causing said first powder layer to fuse in selected locations according to said model to form a first cross section of said three-dimensional article; an executable portion configured for applying a second powder layer on said work table; an executable portion configured for directing the at least one energy beam over said work table causing said second powder layer to fuse in selected locations according to said model to form a second cross section of said three-dimensional article, wherein said second layer is bonded to said first layer; an executable portion configured for detecting a local thickness in at least two positions in at least said second powder layer; and an executable portion configured for varying an energy beam parameter depending on the detected local thickness of said second powder layer in order to melt said second powder layer and to remelt at least a predetermined thickness of said first cross section.

All examples and exemplary embodiments described herein are non-limiting in nature and thus should not be construed as limiting the scope of the invention described herein. Still further, the advantages described herein, even where identified with respect to a particular exemplary embodiment, should not be necessarily construed in such a limiting fashion.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The source of a charged particle beam can include an electron gun, a linear accelerator and so on.

Figure 3:
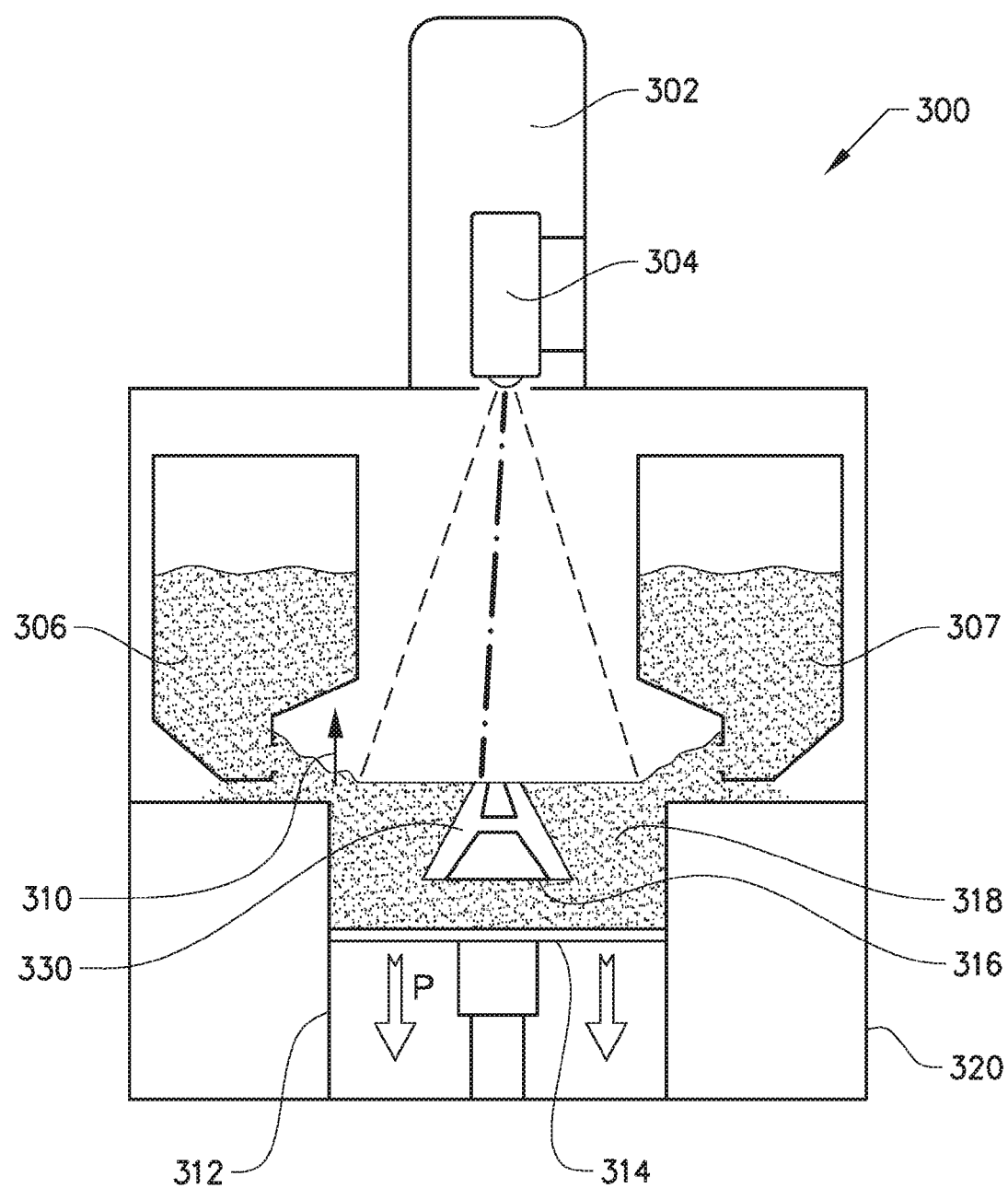
FIG. 3 depicts, in a schematic view, an example of a known device for producing a three-dimensional product to which the inventive method can be applied.

FIG. 3 depicts an example embodiment of a freeform fabrication or additive manufacturing apparatus 300 in which the present inventive method may be implemented. The apparatus 300 comprising an electron gun 302; a camera 304; two powder hoppers 306, 307; a start plate 316; a build tank 312; a powder distributor 310; a build platform 314; and a vacuum chamber 320.

The vacuum chamber 320 is capable of maintaining a vacuum environment via or by means of a vacuum system, which system may comprise a turbo molecular pump, a scroll pump, an ion pump and one or more valves which are well known to a skilled person in the art and therefore need no further explanation in this context. The vacuum system may be controlled by a control unit.

The electron gun 302 is generating an electron beam which is used for melting or fusing together powder material 318 provided on the start plate 316. At least a portion of the electron gun 302 may be provided in the vacuum chamber 320. A control unit may be used for controlling and managing the electron beam emitted from the electron beam gun 302. At least one focusing coil (not shown), at least one deflection coil and an electron beam power supply may be electrically connected to the control unit. In an example embodiment of the invention the electron gun generates a focusable electron beam with an accelerating voltage of about 60 kV and with a beam power in the range of 0-3 kW. The pressure in the vacuum chamber may be in the range of $10^{-3}$-$10^{-6}$ mBar when building the three-dimensional article by fusing the powder layer by layer with the energy beam.

Instead of melting the powder material with an electron beam a laser beam may be used. In another example embodiment at least two electron beam sources or at least two laser beam sources or at least one laser beam source and at least one electron beam source may be used.

The powder hoppers 306, 307 comprise the powder material to be provided on the start plate 316 in the build tank 312. The powder material may for instance be pure metals or metal alloys such as titanium, titanium alloys, aluminum, aluminum alloys, stainless steel, Co—Cr—W alloy, etc.

The powder distributor 310 is arranged to lay down a thin layer of the powder material on the start plate 316. During a work cycle the build platform 314 will be lowered successively in relation to the ray gun after each added layer of powder material. In order to make this movement possible, the build platform 314 is in one embodiment of the invention arranged movably in vertical direction, i.e., in the direction indicated by arrow P. This means that the build platform 314 starts in an initial position, in which a first powder material layer of necessary thickness has been laid down on the start plate 316. A first layer of powder material may be thicker than the other applied layers. The reason for starting with a first layer which is thicker than the other layers is that one does not want a melt-through of the first layer onto the start plate 316. The build platform is thereafter lowered in connection with laying down a new powder material layer for the formation of a new cross section of a three-dimensional article. Means for lowering the build platform 314 may for instance be through a servo engine equipped with a gear, adjusting screws, etc.

In an example embodiment of a method according to the present invention for forming a three-dimensional article through successive fusion of parts of a powder bed, which parts corresponds to successive cross sections of the three-dimensional article, comprising a first step 602 of providing a model of the three dimensional article. The model may be generated via a CAD (Computer Aided Design) tool. A schematic flowchart of the method is depicted in FIG. 6.

In a second step 604 a first powder layer is provided on the work table 316. Powder may be distributed evenly over the worktable according to several methods. One way to distribute the powder is to collect material fallen down from the hopper 306, 307 by a rake system. The rake may be moved over the build tank thereby distributing the powder over the start plate. The distance between a lower part of the rake and the upper part of the start plate or previous powder layer determines the thickness of powder distributed over the start plate. The powder layer thickness can easily be adjusted by adjusting the height of the build platform 314.

In a third step 606 an energy beam is directed over the work table 316 causing the first powder layer to fuse in selected locations according to the model to form a first cross section of the three-dimensional article. The energy beam may be an electron beam and/or a laser beam. The beam may be directed over the work table 316 from instructions given by a control unit (not shown). In the control unit instructions for how to control the beam sources for each layer of the three-dimensional article may be stored.

Figure 6:
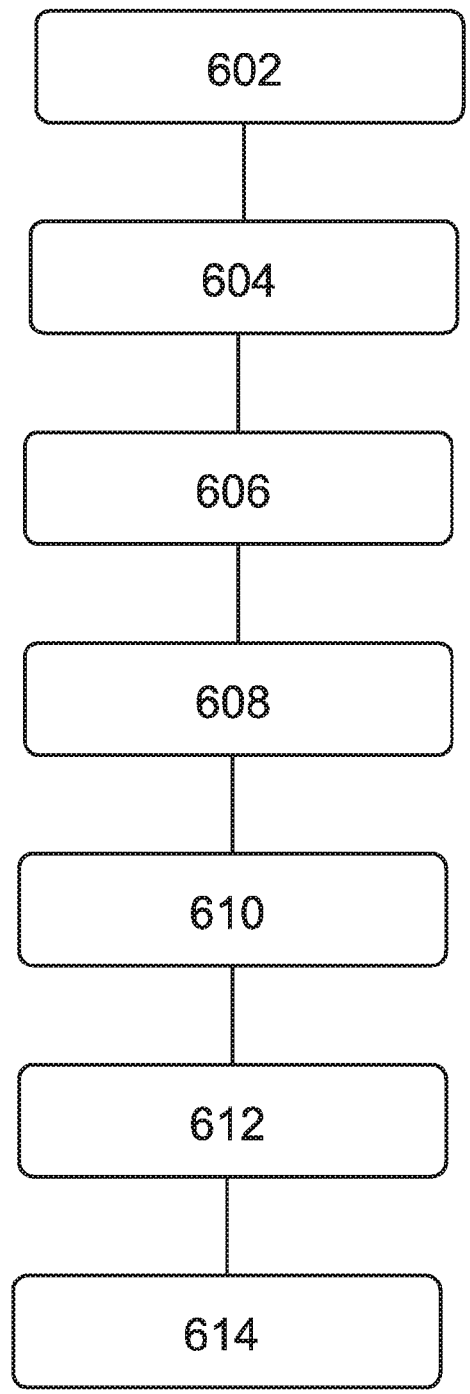
FIG. 6 depicts a schematic flowchart of an example embodiment of the present invention.

After a first layer is finished, i.e., the fusion of powder material for making a first layer of the three-dimensional article, a second powder layer is provided on the work table 316 denoted by step 608 in FIG. 6. The second powder layer may be distributed according to the same manner as the previous layer. However, there might be alternative methods in the same additive manufacturing machine for distributing powder onto the work table. For instance, a first layer may be provided via or by means of a first powder distributor, a second layer may be provided by another powder distributor. The design of the powder distributor is automatically changed according to instructions from the control unit. A powder distributor in the form of a single rake system, i.e., where one rake is catching powder fallen down from both a left powder hopper 306 and a right powder hopper 307, the rake as such can change design.

After having distributed the second powder layer onto a first and partly solidified powder layer that previously has been applied onto the work table, the thickness of the second powder layer in at least two positions may be determined denoted by step 610 in FIG. 6.

In a first example embodiment the thickness of the second powder layer may be determined by using a thermographic camera. The camera may be used to determine a rate at which the temperature of the second layer increases after application onto the first layer.

In an example embodiment a plurality of sequential temperature measurements in at least two positions of the second powder layer may be performed. The temperature measurement may be started before the second powder layer has reached its maximum temperature.

In still another example embodiment the temperature measurement may be performed along an intended melting path for the high energy beam with a predetermined distance between each measurement. In an example embodiment the predetermined distance may be smaller than a largest particle in the powder layer but larger than a smallest particle in the powder layer.

After having made the temperature measurements, a mathematical function may be fitted to the temperature data obtained, wherein one function is fitted to each of the positions of the second layer.

Determining a temperature increase rate for each of the positions may be done by using the mathematical function.

The determined temperature increase rates may be stored at a predefined location.

Each of the determined temperature increase rates may be compared with one or several reference values.

In certain embodiments, in case any of the determined temperature rates is lower than or higher than a set value, another layer of powdery material may be applied onto the working table. New temperature increase rates are determined for the another layer of powdery material.

The temperature measurements may be carried out by the thermographic camera 304 which may be controlled by a control unit. The camera 304 may be directed towards the upper surface of the second layer, which means that it in principle can register a surface temperature of the second layer (even if heat radiated from material positioned slightly below the surface also may reach the camera 304). The position and direction of the camera 304 implies also that the "positions" referred to above in principle are two-dimensional area units in the lateral plane, i.e., a portion of the upper surface of the second layer. The size of each "position" can be varied and depends e.g., on the resolution (the number of pixels) of the camera 304, the distance between the camera 304 and the second layer, and the number of pixels used for each "position".

The camera 304 may be controlled such as to, for all positions, carry out a sequence of temperature measurements that are distributed over a time period during which the second layer heats up as a result of heat conduction from the layer(s) below. After some time the (surface of the) second layer reaches a maximum temperature $T_1$ (see FIGS. 4 and 5). Roughly, at this point in time the rate at which heat is conducted from the layer(s) below equals the rate at which heat is radiated away from the upper surface of the second layer. After that point the temperature of the second layer decreases (at a moderate rate).

The sequential temperature measurements may be initiated as soon as possible after application of powder because the temperature increase rate decreases with time and because the time to reach the maximum temperature is rather short, typically around 1 sec for the apparatus described above. Since the powder distributing member 310 moves from one side to the other over the build platform 314 the point of time at which the second powder layer is applied onto the build platform varies depending on the position of the second layer. Therefore, the sequential temperature measurements in a particular position of the second layer should start as soon as possible after application of powder in that particular position. Preferably according to certain embodiments, a number of temperature measurements are carried out also at and after the second layer has reached its maximum temperature.

The camera 304 may register data also when the powder distributing member 310 moves. This means that pixels "viewing" at positions just at the rear of the member 310 can be used to get measurement data shortly (within around 0.1 s) after powder application.

The plurality of sequential temperature measurements carried out in each position before the second layer 8 has reached the maximum temperature $T_1$ may include at least two temperature measurements. From these two data points it can be possible to estimate the temperature increase rate, in particular if at least one further data point at and/or after the second layer has reached its maximum temperature also is obtained. However, since the temperature increase rate is not linear it is recommended to perform at least three temperature measurements before the second layer has reached the maximum temperature $T_1$. In principle, the higher the number of data points (i.e., temperature measurements), the better the function fit. A measurement frequency of around 10 Hz, i.e., one measurement each 0.1 s, has shown to work well.

Fitting of mathematical functions to data points is well known to the person skilled in the art. Although a standard parameter fit ($y=a_0+a_1x+a_2x^2+\ldots+a_nx^n$) probably could be used in the present case, the fit is preferably, in certain embodiments, made by using an adequate theoretical function for temperature equilibrium involving heat conduction from the underlying layer(s) and heat radiation from the second, upper layer. Such a theoretical function can for instance comprise the following parameters: layer thickness, material properties of the powdery material and powder particle size distribution. An advantage of using an adequate theoretical function is that the resulting layer thickness is derived from relevant physical relationships.

The expression "fitting of a (mathematical) function" is considered to cover also the situation where only two data points are available (in which case a line or curve is "fitted" to two points).

An analysis of the measurement data obtained may be made for all positions distributed over the second layer. With a proper distribution of the positions, this provides information on the temperature increase rate over the entire second layer.

In the step following the fitting of functions it is determined a temperature increase rate for each of the positions. This step may be regarded as a part of the fitting-step. Typically, a parameter is determined in the fitting-step, which parameter represents the temperature increase rate. This rate is in turn directly related to the thickness of the second powder layer 8.

Storing of the determined temperature increase rates, e.g., in a memory connected to the control unit, is useful not only for making the data available for calculations and comparisons but also for quality assurance reasons. For instance, if an object produced by the inventive method breaks in a certain way during use it may be helpful to go back to production data and find out whether the thickness and/or homogeneity of the powder layers have been correct.

In a following step in certain embodiments, each of the determined temperature increase rates is compared with one or several reference values. In case any of the determined rates (or another parameter related in a known way to a corresponding rate) is lower than or higher than a set value, this step is followed by the step of reapplying a layer of powdery material onto the working area 5. This means that if the second layer for instance is not sufficiently homogenously distributed over the working area 5, the powder distribution member 12 will complement it with another layer of powdery material. New temperature increase rates are determined for the reapplied powder layer which may be used in the following process steps.

Figure 4:
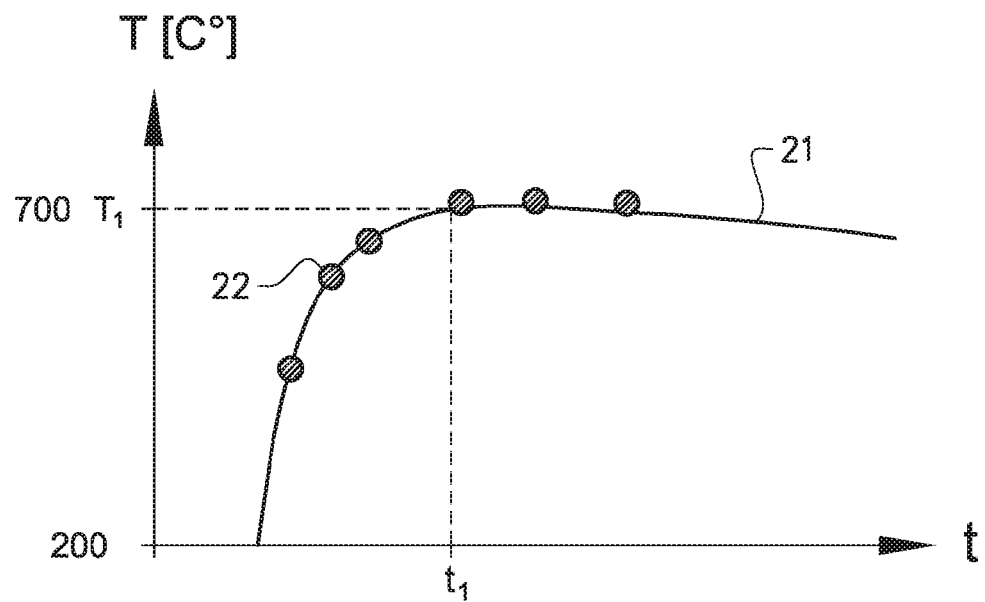
FIG. 4 depicts a schematic example of a measured and fitted temperature data of a "thin" powder layer.
Figure 5:
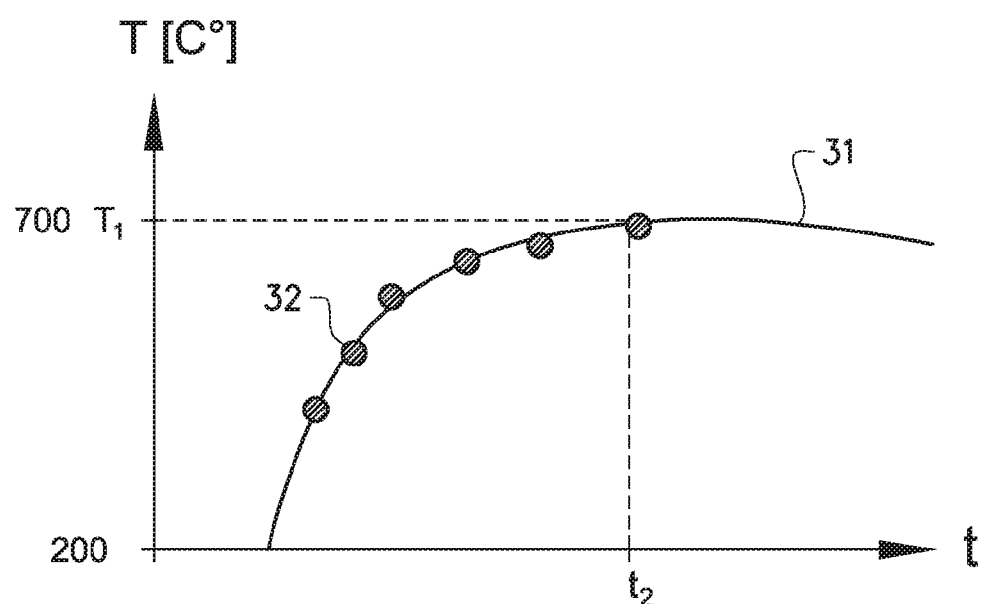
FIG. 5 depicts a schematic example of a measured and fitted temperature data of a "thick" powder layer.

FIG. 4 shows a schematic example of measured and fitted temperature data of a "thin" second powder layer (or a position of the second layer in which the layer is "thin"). As a comparison, FIG. 5 shows a schematic example of measured and fitted temperature data of a "thick" second powder layer (or a position of the second layer in which the layer is "thick). Thus, the data in FIG. 5 refer to a thicker powder layer than the data in FIG. 4.

Data points 22 in FIG. 4 represent the sequential temperature measurements, whereas a curve 21 represents the function fitted to the data points 22, i.e., the curve 21 represents the temperature at the surface of the powder layer. It can be seen that the temperature increases very fast in the beginning (shortly after application of powder) which means that the temperature increase rate, i.e., the derivative of the curve 21, is very large in the beginning. The rate decreases successively and becomes zero at $t=t_1$ at which point of time the temperature has reached its maximum temperature $T_1$. After this, the temperature decreases slowly.

In the schematic example shown in FIG. 4, the number of data points 22 representing the sequential temperature measurements is six; three before the temperature has reached its maximum temperature $T_1$, and three at or after the point of time $t_1$ when the maximum temperature $T_1$ has been reached.

In similarity with FIG. 4, data points 32 in FIG. 5 represent the sequential temperature measurements, whereas a curve 31 represents the function fitted to the data points 32, i.e., the curve 31 represents the temperature at the surface of the "thick" powder layer. Also in this case the number of data points 32 is six, but in this case five of them refer to the time period before the temperature has reached its maximum temperature $T_1$, The point of time in which the maximum temperature $T_1$ is reached is denoted $t_2$ in FIG. 5.

By comparing FIGS. 4 and 5 the principal difference between layers of different thickness can be seen in that the temperature increases more slowly in the "thick" layer of FIG. 5 which means that the temperature increase rate is lower in the "thick" layer. In both cases the rate decreases successively and becomes zero when the temperature has reached its maximum temperature $T_1$, which maximum temperature $T_1$ has about the same value in both cases. However, the time lapsed until the maximum temperature $T_1$ is reached differs; t2>t1.

Each individual temperature measurement 22, 32, i.e., each "sampling" of the temperature, is preferably, in certain embodiments, carried out during such a short period of time that the temperature variation during this period of time is negligible.

The temperature sensing devices of prior art apparatuses has generally been used for checking the temperature before solidification and relate to the point of time when the temperature curve has levelled off, i.e., when the temperature of the applied powder layer has reached and passed a maximum temperature. Such a prior art temperature measurement corresponds to one point at the far right of the temperature curves shown in FIGS. 4 and 5.

A thermographic camera, sometimes called infrared (IR) camera or thermal camera, is commonly regarded as a device that can form an image using infrared radiation, similar to a common camera that forms an image using visible light. A digital thermographic camera can be regarded as a temperature sensing device wherein each pixel forms an individual temperature sensing unit. The temperature measurements, i.e., the data points 22, 32 in FIGS. 4 and 5, can be based on the signal from an individual pixel or from several pixels.

In a next step, denoted by 612 the energy beam is directed over the work table causing the second powder layer to fuse in selected locations to form a second cross section of the three-dimensional article.

Fused portions in the second layer may be bonded to fused portions of the first layer. The fused portions in the first and second layer may be melted together by melting not only the powder in the uppermost layer but also remelting at least a fraction of a thickness of a layer directly below the uppermost layer.

In a seventh step denoted by 614 an energy beam parameter is varied depending on the detected local thickness of the second powder layer in order to melt the second powder layer and to remelt at least a predetermined thickness of the first cross section.

Figure 1:
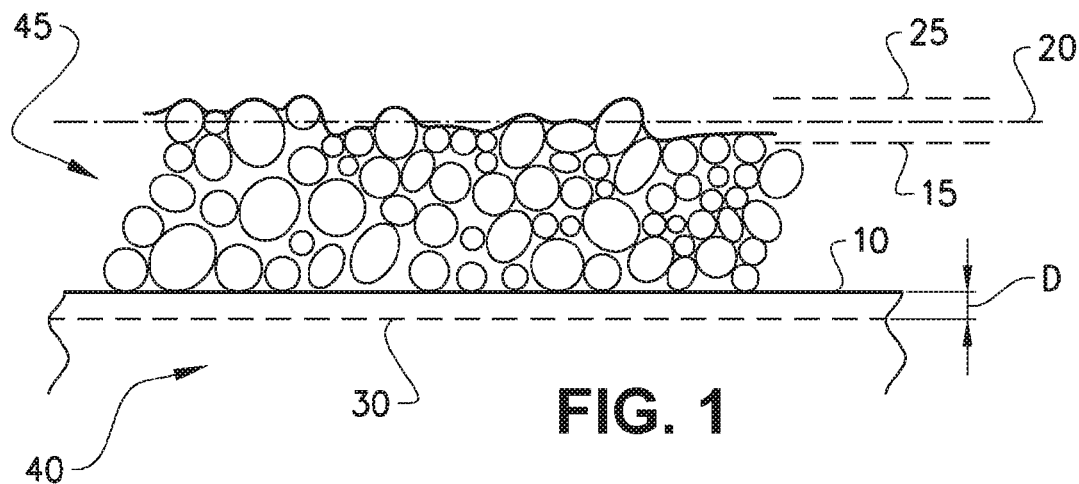
FIG. 1 depicts, in a schematic view, a cross section of a powder layer on top of a partially formed three-dimensional article.

In FIG. 1 it is illustrated a cross section of a powder layer 45 on top of a surface 10 of a partially formed three-dimensional article 40. For various reasons the thickness of the powder layer 45 may vary from one position to another. The variations may be caused by the powder distributor, temperature variations, powder imperfections, etc. In FIG. 1 the powder thickness is varied between a maximum value denoted by 25 and a minimum value denoted by 15. An average powder thickness is denoted by 20 in FIG. 1.

It is desirable to melt not only the powder layer 45 but also at least a fraction of the thickness of the underlying partially formed three dimensional article 40. The degree of remelting of the underlying partially formed three dimensional article 40 is determined beforehand. A predetermined thickness D from the top surface 10 of the underlying partially formed three dimensional article 40 to a position 30 in the partially formed three dimensional article 40 is remelted when the powder layer 45 is fused by the energy beam.

The thickness D may in a first example embodiment be 1-5% of the previous layer thickness. In another example embodiment the thickness D may be 1-10% of the previous layer thickness. In still another example embodiment the thickness D may be 5-20% of the previous layer thickness. In yet another example embodiment the thickness D may be 10-50% of the previous layer thickness. In still another example embodiment the thickness D may be more than 50% of the previous layer thickness.

Consider that the desired thickness D is smaller than 5% of the previous layer thickness and the output power and scan speed of the energy beam is set to be independent of the thickness variations of the powder layer 45, so that a remelting of the underlying partially formed three dimensional article will be 5% of the previous layer thickness only for the average thickness of the powder layer 45. In the example embodiment as depicted in FIG. 1 the remelted thickness D will be thicker for the positions where the thickness is below the average thickness 20 and no remelting for the thickness above the average thickness 20. If no remelting occurs at one or several positions there will be some weaknesses in the material and for some applications it will not be suitable. One way of taking care of the non-remelting of the underlying layer is to provide sufficient energy deposition from the energy beam at any position for ensuring at least a partial melting of the underlying layer. However, this will cause a variable thickness D of the remelted layer, because there is a variation in the thickness of the powder layer 45. This is undesirable for various reasons, e.g., the material characteristics will be powder thickness dependent, more energy is deposited into the partially formed three-dimensional article than necessary which may cause an increase of the build temperature above the desirable temperature range, which in turn may mean that the part may have to be cooled down and thereby increasing the build time.

The present invention measures the thickness at a number of positions of the newly applied powder layer in order to determine the thickness variations of the powder layer 45 and thereafter melt each position of the powder layer so that the remelted thickness D will be within a predetermined range. By knowing the thickness of the powder layer 45 at each position to be melted one can easily set the parameters of the energy beam so that the desired remelting of the underlying layer will be within the predetermined range. One or more of the following parameters may be changed for each position in order to fulfill the remelting criteria, namely the beam power, beam deflection speed and/or the beam spot size.

A pyrometer may be used instead of, or as a complement to, the thermographic camera 14. However, a camera of the described type may be advantageous in that it allows en easy determination of the temperature increase rate in several positions of the layer which in turn makes it possible to determine the homogeneity of the layer (i.e., the vertical uniformity of the powder layer).

Another exemplary method for determining the thickness of an applied powder layer is to use a SEM (Sweep Electron Microscopy) image of the surface prior to applying a new powder layer and a surface image of the new powder layer. A subtraction of the surface image after and before the application of the new powder layer taking into account the distance the work table has been lowered may give a good knowledge of the actual powder layer thickness distribution for the new powder layer 45.

In still another example embodiment triangulation may be used for determining the topography of the surface prior to applying the new powder layer and the topography of the surface of the new powder layer. A subtraction of the topography after and before the application of the new powder layer 45 taking into account the distance the work table has been lowered may give a good knowledge of the actual powder thickness distribution for the new powder layer 45.

A 3-d scanner may be used in a similar manner instead of the SEM-image or the triangulation for determining the thickness distribution of the new powder layer.

Moreover, the high energy beam can be a laser beam generated by a laser source instead of or in addition to the exemplified electron beam. Further, the powdery material does not necessarily have to be made of metal but can be of e.g., plastics or a composite material.

If the point of time is known at which powder is applied in a certain position onto the working area 5, it can be sufficient to carry out only one temperature measurement at that position (before the maximum temperature is reached) to determine, or at least estimate, the temperature increase rate. This point of time of powder application may be possible to obtain from information via the control unit on the position of the powder distribution member 12 or from optical information. However, determining the exact point of time for powder application may be complicated and, further, using only one single temperature measurement for determining the temperature increase rate introduces a significant uncertainty in the result obtained. By performing a plurality of sequential temperature measurements that "follows" the temperature curve it may not be necessary to establish the point of time for powder application; if desired this can be calculated using the fitted function.

The camera 304 may be any type of camera for example an IR-camera (Infrared-camera), NIR-camera (Near Infrared-camera), a VISNIR-camera (Visual Near Infrared-camera), a CCD camera (Charged Coupled Device-camera), a CMOS-camera (Complementary Metal Oxide Semiconductor-camera), a digital camera.

After having detected the local thickness at predetermined positions of the second powder layer the energy beam parameter is varied depending on the detected thickness of the second powder layer in order to melt the second powder layer and to remelt a predetermined thickness of the first cross section.

An intended beam path may be establishing that is to be used when fusing together the selected area of the at least one powder layer. A temperature may be calculated in the second powder layer along the intended beam path as a function of a specific energy deposition of an imaginary beam that is assumed to move along the intended beam path. The specific energy deposition may be adjusted of the imaginary beam along the intended beam path depending on the calculated temperature and on conditions set for the step of fusing together the selected area such as the detected thickness of the second powder layer. Determining, based on the calculations and the adjustments because of thickness variations, an operating scheme for the specific energy deposition of the real beam to be used for the intended beam path when fusing together the selected area of the at least one layer.

The term "intended beam path" relates to the scan or line pattern that is arranged across the selected area and refers to at least a part of the path the beam spot is intended to follow when the beam is swept over the selected area for the purpose of melting/fusing the powder within that area. In principle, the intended beam path can have any form as long as it provides for a thorough fusing of the powder within the selected area, i.e., it can for instance be segmented or continuous and include both straight and curved portions. Further, the beam path can vary even if the line pattern is the same, for instance if lines are scanned in a different order or if a single line is scanned in an opposite direction.

The step of "calculating the temperature in the at least one powder layer along the intended beam path as a function of a specific energy deposition of an imaginary beam that is assumed to move along the intended beam path" means that a local temperature or temperature distribution in or around a point in or close to the intended beam path along its extension is calculated taking into account the energy deposited to the material by an imaginary beam that is assumed to generate a specific energy deposition while moving along the intended beam path.

The powder layer temperature in a certain point along the intended beam path (at a certain point of time) depends, for instance, on the starting temperature distribution in the material layer, the thermal properties of the material (such as thermal conductivity), the history of the specific energy deposition of the imaginary beam (including the current position of the beam and how much energy or power that has been deposited to the material layer during its path to the current position), and the geometrical pattern of the beam path.

The term "specific energy deposition of the beam" refers to the energy deposited by the (imaginary or real) beam per time unit (beam power) and area unit of the layer (beam spot size), i.e., the power deposited per area unit, divided by the beam speed. Thus, varying the specific energy deposition can be done by varying the speed at which the beam moves over the layer surface, by varying the power of the beam and/or by varying the spot size of the beam (i.e., the layer surface area directly exposed to the beam at a certain point of time). In the calculations, the history of the specific energy deposition of the imaginary beam thus includes also any variations in speed, power or spot size.

The calculations may be complicated and time-consuming and various simplifications can be made that allows a sufficiently accurate temperature to be calculated while still taking into account the history of the specific energy deposition (which may strongly affect the temperature in a point of the intended beam path where the beam not yet has reached but where heat has been conducted from previous, already "fused" parts of the intended beam path).

The step of "adjusting the specific energy deposition of the imaginary beam along the intended beam path depending on the calculated temperature and on conditions set for the step of fusing together the selected area" means that at least one of the beam parameters, i.e., the beam speed, power and/or spot size, is adjusted over a certain portion of the intended beam path if, for instance, the calculations indicate that the temperature becomes higher in a certain point than a condition set for the maximum temperature (which would call for e.g., an increase in beam speed or a reduction in beam power close to that particular point or for a change of the history of the specific energy deposition to reduce indirect, thermally conducted, heating of that point from previous parts of the beam path).

Adjustments of the specific energy deposition of the imaginary beam along the intended beam path may be handled such that re-calculations of the temperature along (parts of) the path are performed using other beam parameters. Alternatively, or as a complement, it is possible to make use of a set of predetermined data related to the material to be fused, wherein the data set comprises suitable values of the specific energy deposition as a function of the calculated temperature and the conditions set. Such predetermined data are useful for avoiding time-consuming re-calculations and can, for instance, be used when the temperature is calculated in a number of points distributed along the intended beam path. Depending on the temperature calculated in a "next" point positioned relatively closely ahead of a point corresponding to the current position of the imaginary beam, a suitable value of the specific energy deposition to be used when moving the beam from the current position until it reaches the "next" point can be directly obtained from the predetermined data. This procedure is repeated for the remaining points distributed along the intended beam path. Thus, in this way the specific energy deposition is stepwise adjusted along the intended beam path.

The term "operating scheme" (for the specific energy deposition) refers to how the specific energy deposition, i.e., how each of the speed, power and spot size, of the real beam is supposed to vary with time (or with position along the beam path since this position is related to time) during the step of fusing the powder. Thus, the operating scheme contains information on how the speed, power and spot size of the beam should vary when fusing the selected area. The step of determining this operation scheme is a form of extraction and summary of the results from the previous steps. In the example above with stepwise adjustments of the specific energy deposition the operation scheme includes the stepwise variations of the beam parameters. The operation scheme can also include information on beam parameter settings for parts of the intended beam path where temperature calculations and specific energy deposition adjustments may not be required, such as for an initial part of the intended beam path.

The temperature in the material is related to its content of energy. It is therefore possible to, instead of calculating a true temperature, calculate and make use of another energy- and temperature-related parameter. The term calculated temperature covers also such related parameters.

The steps of establishing the intended beam path, calculating the temperature along the intended beam path, adjusting the imaginary specific energy deposition and determining the operating scheme do not necessarily have to be carried out one at a time or strictly in the order given. For instance, calculations and adjustments can be carried out in an iterative manner and the operating scheme can be determined step by step for fractions of the entire beam path. Further, although the step of establishing the intended beam path can be rather simple—a preset line pattern with equally spaced straight and parallel lines with a given scan direction can be chosen—this step may comprise calculations and adjustments for finding a favorable line pattern and a favorable, finally selected, intended beam path.

Accordingly, the specific energy deposition of the beam to be used when fusing together the powder can be pre-adjusted to vary in response to the temperature build-up for the particular scan pattern to be used by calculating the resulting temperature along the beam path for different specific energy depositions and conditions. In other words, the inventive method makes it possible to predetermine, by calculation and adaptation, how the specific energy deposition of the beam should vary with time (or position on the selected area) when it passes along the path pattern and melts the powder in order to remelt a predetermined thickness of the first cross section.

Various conditions may be used in the calculations to optimize the operation scheme of the specific energy deposition such as to minimize production time, avoid exceeding a certain maximum temperature, avoid exceeding a certain temperature during a certain time interval, minimizing the highest temperature acquired, obtain an even width of melted material along the beam path, and various combinations of these, such as a compromise between minimizing production time and the highest temperature acquired. Various possible beam paths can be evaluated before selecting the intended one.

To simplify and speed up the calculations, the conditions can include preset (pre-calculated) values of one or two of the beam parameters (speed, power and spot size) and/or a preset beam path, such as a set of parallel lines placed at a similar distance from each other.

The inventive method is generic and is applicable to any geometry of the selected area. It should be noted that a powder layer may comprise several selected areas that may have similar or different geometries.

When a suitable specific energy deposition operation scheme has been determined, this scheme is used for the actual melting/fusing together of (the part of) the selected area of the layer in question. The inventive method is preferably, in certain embodiments, used on all, or at least most of, the layers in the object formed.

An effect of the invention is that it provides for a thorough control of the temperature and the temperature distribution of the selected area and makes it possible to plan the fusion step in a sophisticated way. In turn, this can be used to avoid reaching too high temperatures (which may destroy the product being built), to obtain a homogeneous temperature distribution (which improves the product properties by reducing stress and crack formation) and to speed up the production (which makes the production more cost-effective).

Calculations may be carried out in real time, which means that fusing of the powder may be carried out at the same time as the calculations. Typically, calculations of the beam parameter operating scheme for a subsequent layer is carried out while a previous layer is fused. In principle it is possible to carry out all calculations and determinations of the operation scheme for all layers before starting the fusion process of the first layer, but this would normally lead to a waiting time before starting the production. In the other extreme the calculations and determinations of the operation scheme may be carried out for points along the beam path very close to where the real beam may be positioned, but this would lead to a very small margin for making corrections or re-calculations if something goes wrong in the calculations or in the fusing.

Figure 2:
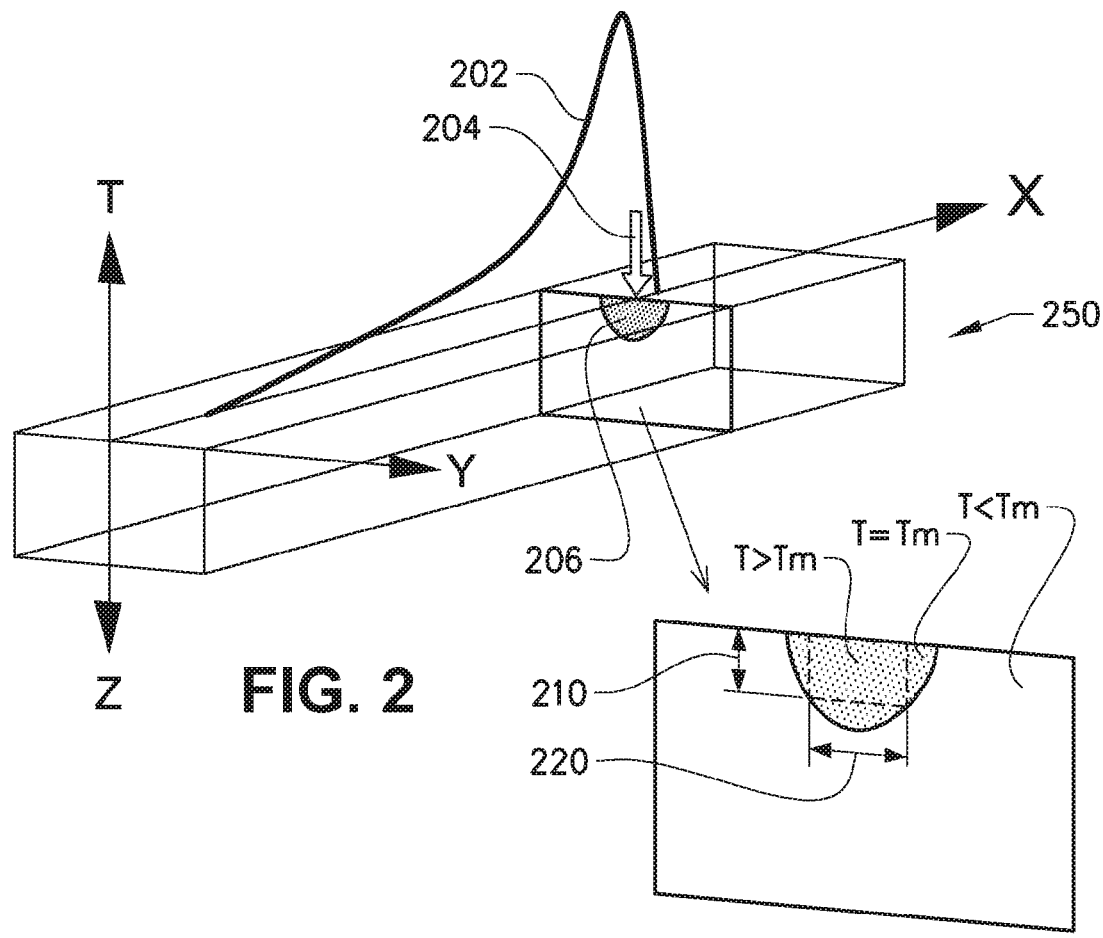
FIG. 2 depicts, in a schematic view, the surface temperature profile and the corresponding melt depth and melt width in a box where the beam is travelling in the direction of positive x-axes.

FIG. 2 depictures a test box 250 where the beam 204 is travelling in the direction of the positive x-axes. The temperature profile 202 at the surface is shown together with a slice 206 in which a melt volume is represented by the isothermal curve corresponding to the melt temperature of the material. Moreover the maximum temperature within the material may be limited to Tmax. Of course there could be other conditions used for optimizing the beam parameters. For instance minimizing temperature gradients in the melt volumes could be one such condition. The melt volume may have a specific depth 210 and a specific width 220, which are depending on the energy beam parameters such as energy beam power, energy beam deflection speed, and/or spot size. The temperature in the center of the melt volume is highest. The outskirts of the melt volume has a slightly lower temperature than in its center. The temperature outside the melt volume is below the temperature in the outskirts of the melt pool. Tm denoted the melting temperature of a particular powder material.

The temperature profiles needed for describing the energy input at the end of a hatch line will be obtained by approximating the temperature with a series of Gaussian functions. By doing this it will later on be possible to obtain an analytical solution for the temperature distribution in the half infinity domain even for an arbitrary number of hatch lines. The series T'(x,y,z) will be:

$$T(x, y, z) \approx T'(x, y, z) = T_0 + \sum_{i=1}^{i=N} A_i \exp(-(x - xpos_i)^2 / \sigma_{x_i}) \exp(-z^2 / \sigma_{z_i}) \exp(-y^2 / \sigma_{y_i})$$

The parameters $A_i$, $xpos_i$, $\sigma_{x_i}$, $\sigma_{y_i}$, $\sigma_{z_i}$ and a can be obtained from a point wise non-linear square fit between T(x,y,z) and T'(x,y,z). Here, $xpos_i$ is the x-position of the exponential term i along the beam path. In the beam coordinate system it will be a negative value since the beam is assumed to travel in the positive x-direction and located at x=0.

The time dependent temperature distribution, T'(x,y,z,t), within the material after the beam has scanned one line may be obtained by Green functions and convolution.

The energy beam, which may be a laser beam or an electron beam, not only melts the last applied powder layer but also at least a portion of the layer of material below the powder layer resulting in a melt comprising the powder material and already melted material from a previous fusion process.

In another aspect of the invention it is provided a program element configured and arranged when executed on a computer to implement the various methods described herein. The program may be installed in a computer readable storage medium. The computer readable storage medium may be the control unit. The computer readable storage medium and the program element, which may comprise computer-readable program code portions embodied therein, may further be contained within a non-transitory computer program product. Further details in this regard are provided elsewhere herein.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 7:
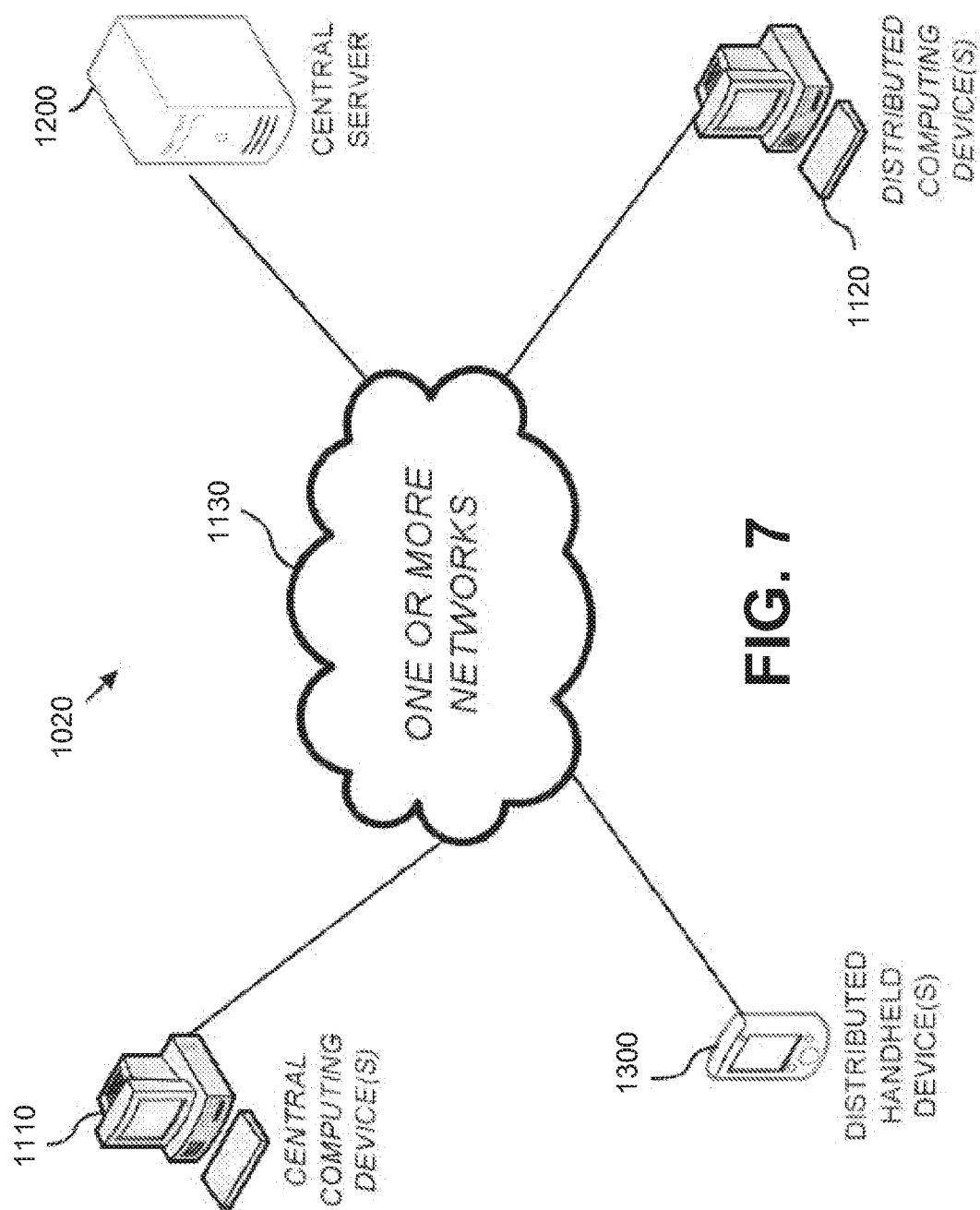
FIG. 7 is a block diagram of an exemplary system 1020 according to various embodiments.

FIG. 7 is a block diagram of an exemplary system 1020 that can be used in conjunction with various embodiments of the present invention. In at least the illustrated embodiment, the system 1020 may include one or more central computing devices 1110, one or more distributed computing devices 1120, and one or more distributed handheld or mobile devices 1300, all configured in communication with a central server 1200 (or control unit) via one or more networks 1130. While FIG. 7 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 7 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 8A:
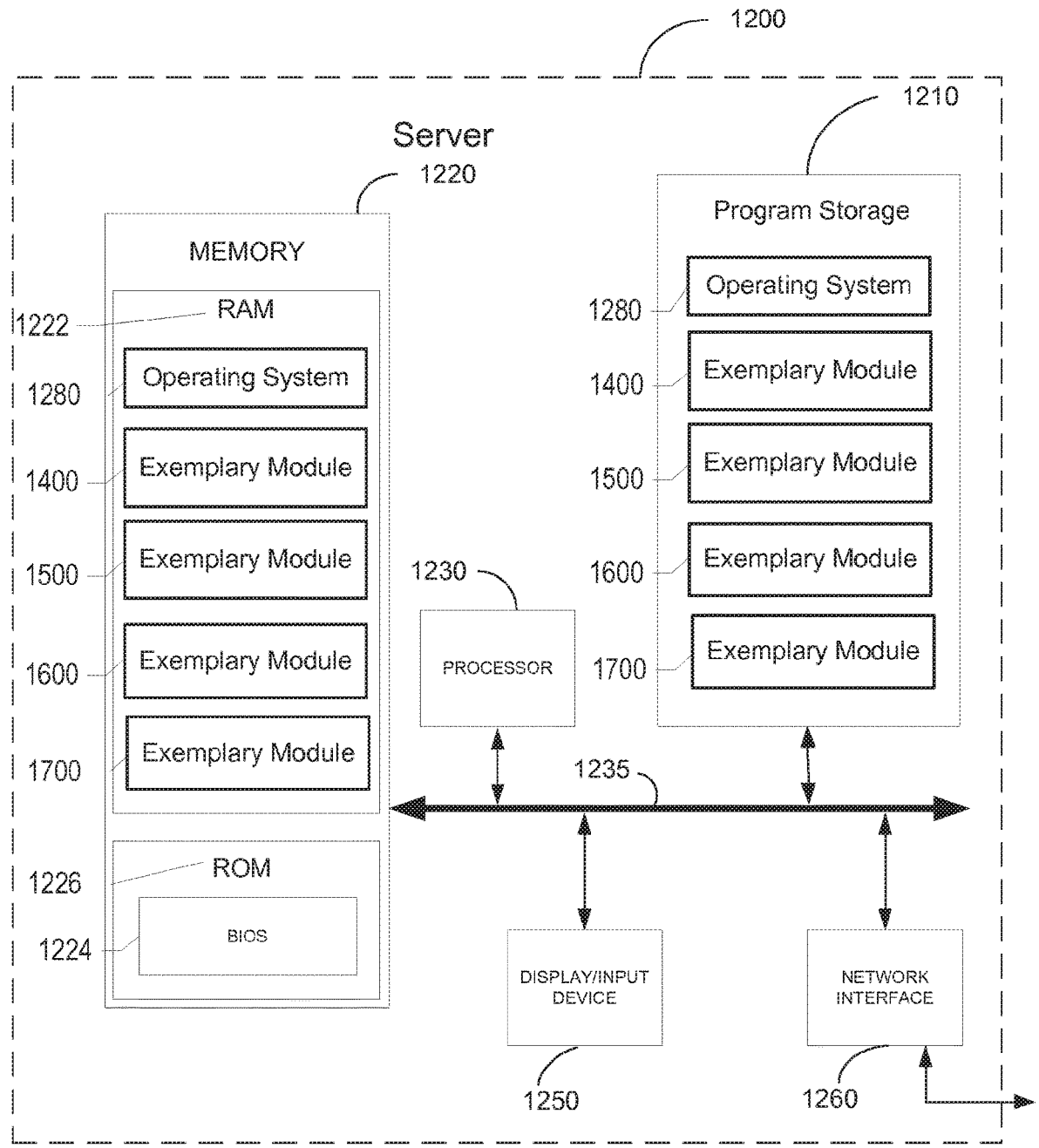
FIG. 8A is a schematic block diagram of a server 1200 according to various embodiments.

FIG. 8A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which preferably includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1020. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 8B:
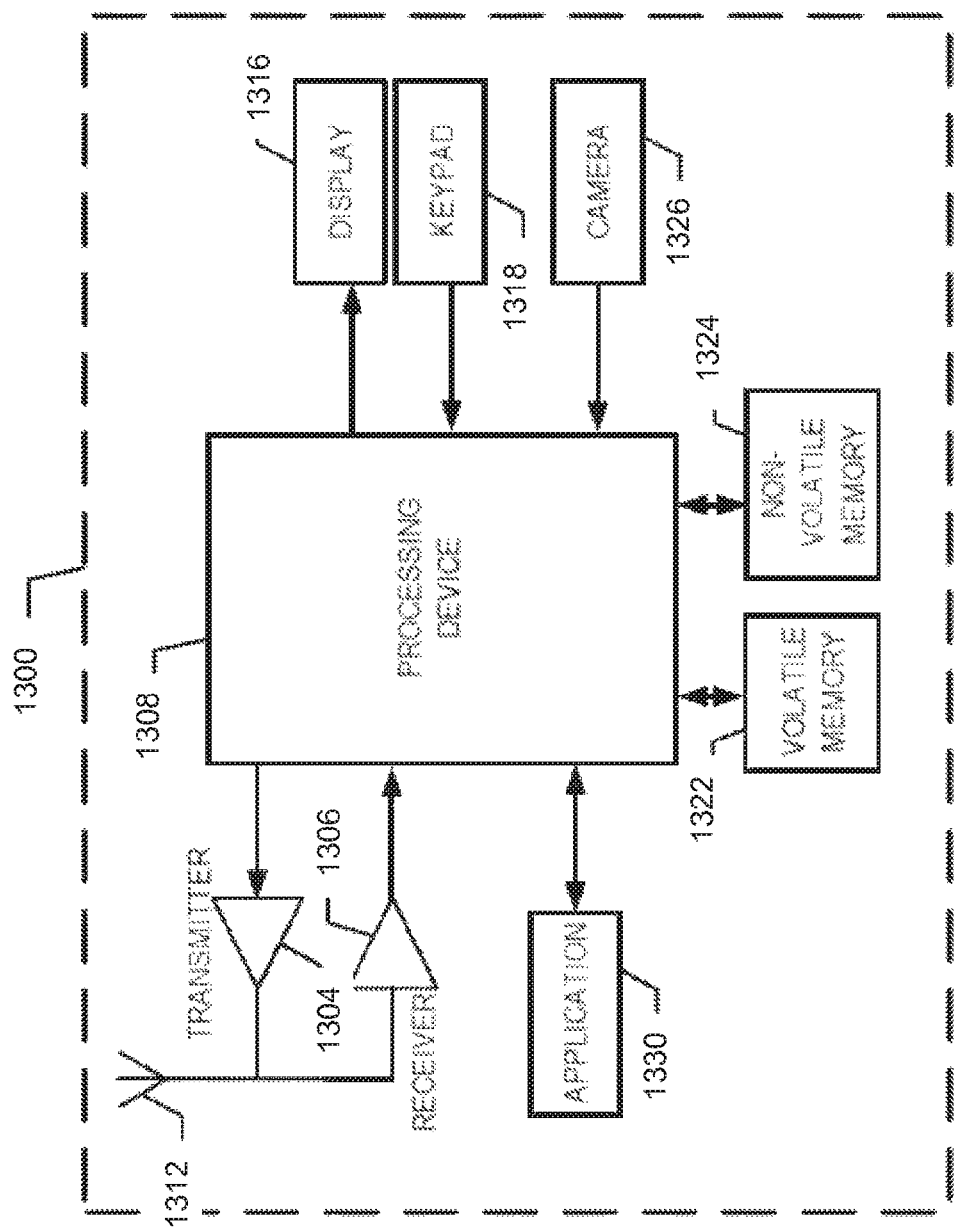
FIG. 8B is a schematic block diagram of an exemplary mobile device 1300 according to various embodiments.

FIG. 8B provides an illustrative schematic representative of a mobile device 1300 that can be used in conjunction with various embodiments of the present invention. Mobile devices 1300 can be operated by various parties. As shown in FIG. 8B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1020 as a whole.

The invention is not limited to the above-described embodiments and many modifications are possible within the scope of the following claims. Such modifications may, for example, involve using a different source of ray gun than the exemplified electron beam such as laser beam. Other materials than metallic powder may be used, such as powder of polymers, and powder of ceramics. Images taken from more than 2 layers may also be possible, i.e., in another embodiment of the present invention for detecting a defect at least one image from at least three, four or more layers are used. A defect may be detected if the defect position in the three, four or more layers are at least partly overlapping each other. The thinner the powder layer the more powder layers may be used in order to detect a factual defect. Powder layer thickness may also be measured or calculated for the very first layer, e.g., where the previous layer is a start plate or a powder bed.

That which is claimed:

1. A program element configured and arranged when executed on a computer to implement a method for forming at least one three-dimensional article through successive fusion of parts of a powder bed, which parts correspond to successive cross sections of the at least one three-dimensional article, said method comprising the steps of:
- providing a model of said at least one three dimensional article;
- applying a first powder layer on a work table;
- directing at least one energy beam over said work table causing said first powder layer to fuse in selected locations according to said model to form a first cross section of said three-dimensional article;
- applying a second powder layer on said work table;
- directing the at least one energy beam over said work table causing said second powder layer to fuse in selected locations according to said model to form a second cross section of said three-dimensional article, wherein said second layer is bonded to said first layer;
- detecting a local thickness in at least two positions in at least said second powder layer, wherein said local thickness is determined by the steps of:
  - detecting a first topography of a surface onto which a new powder layer is to be applied;
  - detecting a second topography of a surface of the new powder layer;
  - subtracting said second topography with said first topography resulting in a third topography; and
  - adding a distance said work table is lowered to said third topography resulting in said thickness of said new powder layer; and
- varying an energy beam parameter depending on the detected local thickness of said second powder layer in order to melt said second powder layer and to remelt at least a predetermined thickness of said first cross section.

2. A computer readable medium having stored thereon the program element according to claim 1.

3. A non-transitory computer program product comprising at least one non transitory computer-readable storage medium having computer-readable program code portions embodied therein, the computer-readable program code portions comprising:
- an executable portion configured for, upon receipt of a model of at least one three dimensional article, applying a first powder layer on a work table so as to initiate forming said at least at least one three-dimensional article through successive fusion of parts of a powder bed, which parts correspond to successive cross sections of the at least one three-dimensional article;
- an executable portion configured for directing at least one energy beam over said work table causing said first powder layer to fuse in selected locations according to said model to form a first cross section of said three-dimensional article;
- an executable portion configured for applying a second powder layer on said work table;
- an executable portion configured for directing the at least one energy beam over said work table causing said second powder layer to fuse in selected locations according to said model to form a second cross section of said three-dimensional article, wherein said second layer is bonded to said first layer;
- an executable portion configured for detecting a local thickness in at least two positions in at least said second powder layer, wherein said local thickness is determined by the steps of:
  - detecting a first topography of a surface onto which a new powder layer is to be applied;
  - detecting a second topography of a surface of the new powder layer;
  - subtracting said second topography with said first topography resulting in a third topography; and
  - adding a distance said work table is lowered to said third topography resulting in said thickness of said new powder layer; and
- an executable portion configured for varying an energy beam parameter depending on the detected local thickness of said second powder layer in order to melt said second powder layer and to remelt at least a predetermined thickness of said first cross section.

4. The non-transitory computer program product of claim 3, wherein said remelted predetermined thickness is constant throughout the portions of said first cross section, which is remelted.

5. The non-transitory computer program product of claim 3, wherein said predetermined thickness of said first cross section, which is remelted, is greater than 50% of the thickness of the first cross section.

6. The non-transitory computer program product of claim 3, wherein said predetermined thickness of said first cross section, which is remelted, is at least one of 1-5%, 5-10%, or 10-20% of the thickness of the first cross section.

* * * * *